N. MacINNES.
AUTOMOBILE BUMPER.
APPLICATION FILED NOV. 30, 1921.

1,422,103.

Patented July 11, 1922.

2 SHEETS—SHEET 1.

Witnesses:
Berthold Watt
B. G. Richards

Inventor
Neil Mac Innes
By Joshua H. Potts
his Attorney

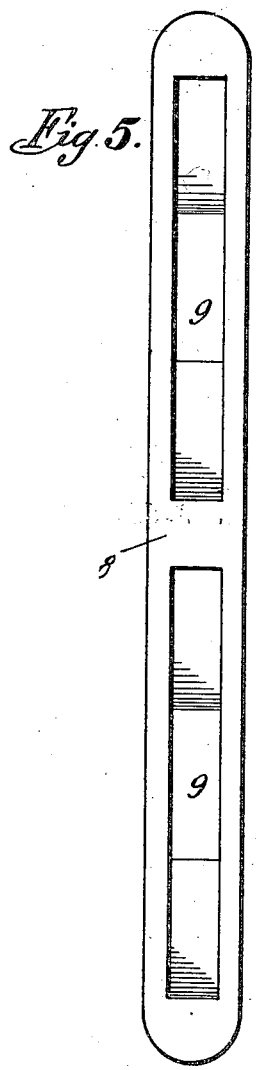
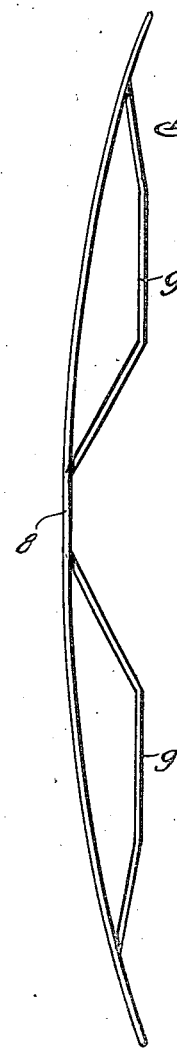
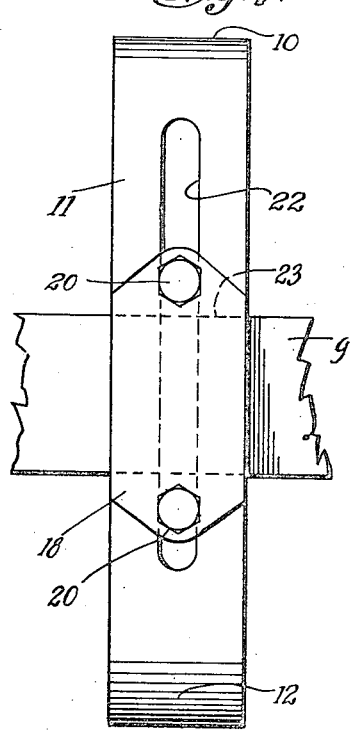

UNITED STATES PATENT OFFICE.

NEIL MacINNES, OF CHICAGO, ILLINOIS.

AUTOMOBILE BUMPER.

1,422,103.   Specification of Letters Patent.   Patented July 11, 1922.

Application filed November 30, 1921. Serial No. 518,750.

*To all whom it may concern:*

Be it known that I, NEIL MacINNES, a citizen of the United States, and a resident of the city of Chicago, county of Cook, and State of Illinois, have invented certain new and useful Improvements in Automobile Bumpers, of which the following is a specification.

My invention relates to improvements in bumpers, especially adapted for use on automobiles and the like, the object of the invention being to provide an improved construction of this character capable of economical production and highly efficient in use.

Other objects will appear hereinafter.

The invention consists in the combinations and arrangements of parts hereinafter described and claimed.

Figure 1:
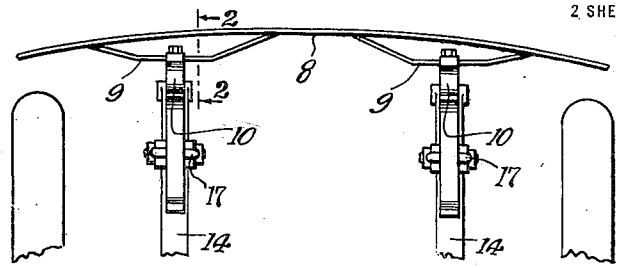
Figure 2:
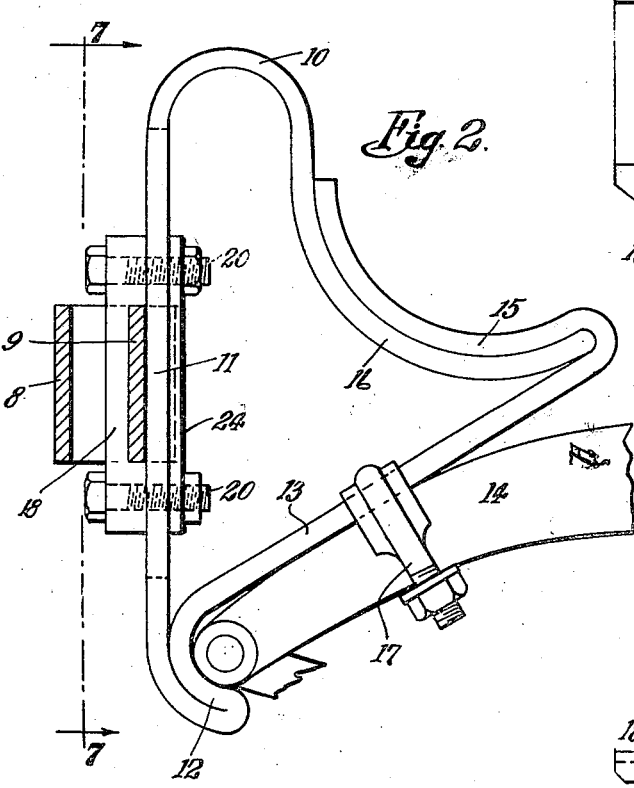
Figure 3:
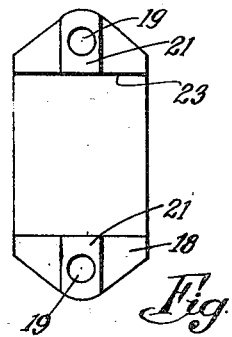
Figure 4:
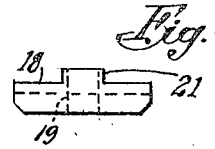

The invention will be best understood by reference to the accompanying drawings forming a part of this specification, and in which, Fig. 1 is a partial top plan view showing a bumper embodying the invention and secured in position of use on the front of an ordinary automobile, Fig. 2 is an enlarged section taken substantially on line 2—2 of Fig. 1, Fig. 3 is a rear face view of a clamping block employed in the construction, Fig. 4 is an end view corresponding with Fig. 3, Fig. 5 is a rear view of a bumper bar employed in the construction, Fig. 6 is a top plan view of the same, and Fig. 7 is a view taken substantially on line 7—7 of Fig. 2.

The preferred form of construction as illustrated in the drawings, comprises a steel bar 8 bent into a shallow curve as shown, and having securing arches 9 struck from each end thereof and extended rearwardly and shaped into substantially arch form as indicated.

A mounting bracket 10 is provided for securing each of the arches 9 to the corresponding side bar of an automobile. Each of the brackets 10 is formed from a single strip of steel bent as indicated into substantially triangular form, forming a front vertical side 11, a downwardly and rearwardly extending lip 12 at the lower apex of the triangle, an upwardly and rearwardly inclined side 13 adapted to rest, with the lip 12, against the side bar 14 of the automobile. The remaining side of the triangle is formed of the overlapped ends 15 and 16 of said strip, said ends 15 and 16 being overlapped and inwardly bowed to correspond, and as indicated, to form the said side of said triangle into a spring. A substantially U-shaped clamp or clevis 17 is provided and utilized as indicated to secure each of the brackets 10 to the corresponding side bar 14 of the automobile as shown.

Clamping heads 18 are also provided to rest against the front sides 11 of said brackets, each clamping head being provided with perforations 19 at its ends for the passage of securing bolts 20 and with guide lugs 21 sliding in a vertical slot 22 in the front side 11 of the corresponding bracket 10. Each clamping head 18 is also provided with a transverse slot 23 adapted to engage the corresponding securing arch 9 to clamp the same against the corresponding side 11. Cooperating with each clamping head 18 is a plate 24 adapted to fit against the rear side of each bracket side 11 and also perforated for the passage of the bolts 20, and whereby the bumper bar 8 may be readily and adjustably secured to the front of the automobile. By this arrangement a simple and effective flexible spring mounting is provided for each end of the bumper bar.

The construction disclosed, constitutes a simple and effective one for the purpose, which is capable of economical production and highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A bumper comprising a bar having a portion struck therefrom and extended rearwardly to form a securing member for said bar, substantially as described.

2. A bumper comprising a bar having a portion struck therefrom and extended rearwardly and shaped into an arch to form a securing and stiffening member for said bar, substantially as described.

3. A bumper comprising a bar having two portions struck from the ends thereof and extended rearwardly to form securing members for said bar, substantially as described.

4. A bumper comprising a bar having two portions struck from the ends thereof and extended rearwardly and shaped into arches to form securing and stiffening members for said bar, substantially as described.

5. A bumper comprising a bar having a portion struck therefrom and extended rearwardly to form a securing member for said bar; two flexible brackets; and means for securing said brackets to said securing member and the frame of an automobile or the like, substantially as described.

6. A bumper comprising a bar having a portion struck therefrom and extended rearwardly and shaped into an arch to form a securing and stiffening member for said bar; two flexible brackets; and means for securing said brackets to said securing member and the frame of an automobile or the like, substantially as described.

7. A bumper comprising a bar having two portions struck from the ends thereof and extended rearwardly to form securing members for said bar; two flexible backets; and means for securing said brackets to said securing members and to the frame of an automobile or the like, substantially as described.

8. A bumper comprising a bar having two portions struck from the ends thereof and extended rearwardly and shaped into arches to form securing and stiffening members for said bar; two flexible brackets; and means for securing said brackets to said securing members and to the frame of an automobile or the like, substantially as described.

9. A bumper comprising a bar having two portions struck from the ends thereof and extended rearwardly and shaped into arches to form securing and stiffening members for said bar; two flexible brackets in substantially triangular form; a clamp securing each bracket to the frame of an automobile; and a clamp adjustably securing each bracket to the corresponding securing arch member of said bar, substantially as described.

10. In a bumper of the class described comprising a bracket formed of spring material of substantially inverted triangular shape, having one side fastened in position, the other side thereof having a bumper mounted intermediate its ends, substantially as described.

11. A bracket of the class described formed of a single strip of spring material bent into substantially triangular form, the ends of said strip being correspondingly inwardly bowed and overlapped to form a spring side to said bracket, substantially as described.

12. A bracket of the class described consisting of a single strip of spring material bent into substantially triangular form, a rearwardly and downwardly turned extension being formed by one of the apices of said triangle and the ends of said strip being overlapped and inwardly bowed to form the side of said triangle opposite said extension, substantially as described.

13. In a bumper of the class described comprising a bracket formed of a single strip of spring material bent into substantially inverted triangular form, the ends of said strip being correspondingly inwardly bowed and overlapped to form a spring base for said bracket; means for securing one side of said bracket in position; and a bumper mounted on the opposite side of said bracket intermediate its ends, substantially as described.

14. In a bumper of the class described comprising a bracket formed of a single strip of spring material bent into substantially inverted triangular form; a support for said bracket; a rearwardly and downwardly turned extension formed by the apex of said triangle and engaging said support; means for fastening one side of said bracket to said support; and means for fastening a bumper to the opposite side of said bracket intermediate the ends thereof, substantially as described.

In testimony whereof, I have signed my name to this specification in the presence of two subscribing witnesses.

NEIL MacINNES.

Witnesses:
Joshua R. H. Potts,
Freda C. Appleton.